United States Patent
Brames et al.

(10) Patent No.: US 12,377,727 B1
(45) Date of Patent: Aug. 5, 2025

(54) SYSTEM FOR SECURING TANKS TO MOBILE MACHINES

(71) Applicant: Caterpillar Inc., Peoria, IL (US)

(72) Inventors: Aaron M. Brames, Morton, IL (US); Sean David Lawson, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/817,339

(22) Filed: Aug. 28, 2024

(51) Int. Cl.
  B60K 15/07 (2006.01)

(52) U.S. Cl.
  CPC .................. B60K 15/07 (2013.01)

(58) Field of Classification Search
  CPC .................................................. B60K 15/07
  See application file for complete search history.

(56) References Cited

U.S. PATENT DOCUMENTS

| | | | | |
|---|---|---|---|---|
| 2,410,182 A * | 10/1946 | Prior | ............ | B60K 15/067 248/315 |
| 2,641,038 A * | 6/1953 | Christophersen | ........ | F16L 33/02 248/27.1 |
| 4,286,361 A * | 9/1981 | MacKenzie | ............ | F16L 33/08 24/20 LS |
| 4,834,401 A * | 5/1989 | Harrington | ............ | B65D 88/74 280/833 |
| 4,949,929 A * | 8/1990 | Kesselman | ............ | F16B 12/46 248/300 |
| 5,996,207 A * | 12/1999 | Brown | ............ | B60K 15/07 29/430 |
| 6,029,989 A * | 2/2000 | Stuart | ............ | B60R 3/00 182/150 |
| 6,053,533 A * | 4/2000 | Osborn | ............ | B60K 15/067 280/830 |
| 6,926,243 B1 * | 8/2005 | Ziaylek | ............ | A62B 25/00 248/307 |
| 7,044,504 B2 * | 5/2006 | Studebaker | ............ | B60K 15/067 280/783 |
| 7,117,896 B2 * | 10/2006 | Eberling | ............ | B60T 17/06 137/574 |
| 7,677,514 B1 * | 3/2010 | Palmer | ............ | B60K 15/067 248/250 |

(Continued)

OTHER PUBLICATIONS

Servocity, 90° Single Angle Pattern Bracket.

(Continued)

*Primary Examiner* — Paul N Dickson
*Assistant Examiner* — Shams Dhanani

(57) ABSTRACT

An assembly, for securing a tank to a tank mount of a mobile machine, includes a band clamp surrounding a periphery of the tank, a mounting block coupled to the band clamp, and a bracket. The mounting block includes first mounting holes defined in a first surface and second mounting holes defined in a second surface that is angled relative to the first surface by a first angle. The bracket includes a first portion coupled to the tank mount and a second portion coupled to the first portion and angled relative to the first portion by a second angle. The mounting block is engaged with the first portion of the bracket, via the first mounting holes, to set a tension of the band clamp. In addition, the mounting block is engaged with the second portion of the bracket, via the second mounting holes, to support a load of the tank.

20 Claims, 6 Drawing Sheets

(56) References Cited

U.S. PATENT DOCUMENTS

| | | | | |
|---|---|---|---|---|
| 8,220,764 | B2 * | 7/2012 | Ziaylek | A62B 25/00 |
| | | | | 248/316.1 |
| 9,120,372 | B2 * | 9/2015 | Sloan | B60K 15/07 |
| 9,909,535 | B2 * | 3/2018 | Sirosh | F02M 21/029 |
| 10,711,942 | B2 * | 7/2020 | Dang | F16B 12/22 |
| 11,241,953 | B2 * | 2/2022 | Yordanov | B60K 15/067 |
| 2009/0114784 | A1 * | 5/2009 | Tam | F16L 3/137 |
| | | | | 24/115 R |
| 2013/0306695 | A1 * | 11/2013 | Guaresimo | B60R 11/00 |
| | | | | 224/567 |
| 2014/0103130 | A1 * | 4/2014 | Brown | F16M 13/02 |
| | | | | 237/66 |
| 2014/0138173 | A1 * | 5/2014 | Gibb | B60K 15/077 |
| | | | | 180/69.5 |
| 2014/0263380 | A1 * | 9/2014 | Ziaylek | A61G 1/04 |
| | | | | 220/737 |
| 2017/0334288 | A1 * | 11/2017 | Rike | B60K 15/07 |
| 2020/0139808 | A1 * | 5/2020 | Rike | B60K 15/013 |
| 2022/0410700 | A1 * | 12/2022 | Cederberg | F17C 13/08 |
| 2024/0066978 | A1 * | 2/2024 | Izumi | B60K 15/07 |
| 2024/0426328 | A1 * | 12/2024 | Blanchet | B60K 15/07 |

OTHER PUBLICATIONS

Bhoomi Hardware, PVC L Clamp Corner Bracket (pack of 10pcs) 90 Degree Nylon White/Black (1149), https://bhoomihardware.com/product/pvc-l-clamp-corner-bracket/.

* cited by examiner

SYSTEM FOR SECURING TANKS TO MOBILE MACHINES

TECHNICAL FIELD

The present disclosure relates to securing tanks to mobile machines. More particularly, the present disclosure relates to a system and a method for securing a tank, for example, a hydrogen fuel tank, to a tank mount of a mobile machine.

BACKGROUND

Mounting arrangements are utilized for securing structures (e.g., fluid tanks) onto mobile machines. One widely adopted mounting arrangement includes supporting brackets fastened to a portion (e.g., frame, chassis, etc.) of a mobile machine and configured to receive a fluid tank, and band clamps wrapped around the fluid tank to secure the fluid tank through tensioning achieved, for example, via adjusting one or more conventional fastening connections between the band clamps and the portion of the mobile machine.

These conventional fastening connections are adjustable (e.g., by applying torque) to establish necessary clamp tensioning, which in-turn proportionally adjusts a load-carrying capacity of the conventional fastening connections for retaining the structure within the mounting arrangement. Such interdependence between the clamp tensioning and the load-carrying capacity may limit the flexibility and reliability of the conventional mounting arrangements.

German publication no. DE 102021002358 A1 discloses a holding device for holding a hydrogen tank on a motor vehicle. The holding device includes at least two connecting elements, tensioning belts for tensioning the hydrogen tank, and at least two strut elements. The at least two connecting elements are spaced apart from one another in the longitudinal direction of the hydrogen tank and are connected to a frame longitudinal member of the motor vehicle in the installed position. The tensioning belts are fastened to the respective connecting elements. The at least two strut elements rest on an outer side of the hydrogen tank at a distance from one another in the longitudinal direction and can be positively tensioned to the hydrogen tank by the tensioning belts.

SUMMARY OF THE INVENTION

In one aspect, the disclosure relates to an assembly for securing a tank to a tank mount of a mobile machine. The assembly includes a band clamp, a mounting block, and a bracket. The band clamp is configured to surround a periphery of the tank. The mounting block is coupled to the band clamp. The mounting block includes one or more first mounting holes defined in a first surface and one or more second mounting holes defined in a second surface that is angled relative to the first surface by a first angle. The bracket includes a first portion coupled to the tank mount and a second portion coupled to the first portion and angled relative to the first portion by a second angle. The mounting block is configured to be engaged with the first portion of the bracket, via the one or more first mounting holes, to set a tension of the band clamp. In addition, the mounting block is configured to be engaged with the second portion of the bracket, via the one or more second mounting holes, to support a load of the tank.

In another aspect, the disclosure relates to a method for securing a tank to a tank mount of a mobile machine. The method includes surrounding a periphery of the tank with a band clamp. Further, the method includes coupling a mounting block to the band clamp. The mounting block includes one or more first mounting holes defined in a first surface and one or more second mounting holes defined in a second surface that is angled relative to the first surface by a first angle. Furthermore, the method includes coupling a bracket to the tank mount. The bracket includes a first portion coupled to the tank mount and a second portion coupled to the first portion and angled relative to the first portion by a second angle. Moreover, the method includes engaging, via the one or more first mounting holes, the mounting block with the first portion of the bracket to set a tension of the band clamp. In addition, the method includes engaging, via the one or more second mounting holes, the mounting block with the second portion of the bracket to support a load of the tank.

In yet another aspect, the disclosure relates to a mobile machine. The mobile machine includes a frame, a combustion engine supported on the frame, a tank to store fuel for powering the combustion engine, a tank mount for supporting the tank on the frame, and an assembly for securing the tank to the tank mount. The assembly includes a band clamp, a mounting block, and a bracket. The band clamp is configured to surround a periphery of the tank. The mounting block is coupled to the band clamp. The mounting block includes one or more first mounting holes defined in a first surface and one or more second mounting holes defined in a second surface that is angled relative to the first surface by a first angle. The bracket includes a first portion coupled to the tank mount and a second portion coupled to the first portion and angled relative to the first portion by a second angle. The mounting block is configured to be engaged with the first portion of the bracket, via the one or more first mounting holes, to set a tension of the band clamp. In addition, the mounting block is configured to be engaged with the second portion of the bracket, via the one or more second mounting holes, to support a load of the tank.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
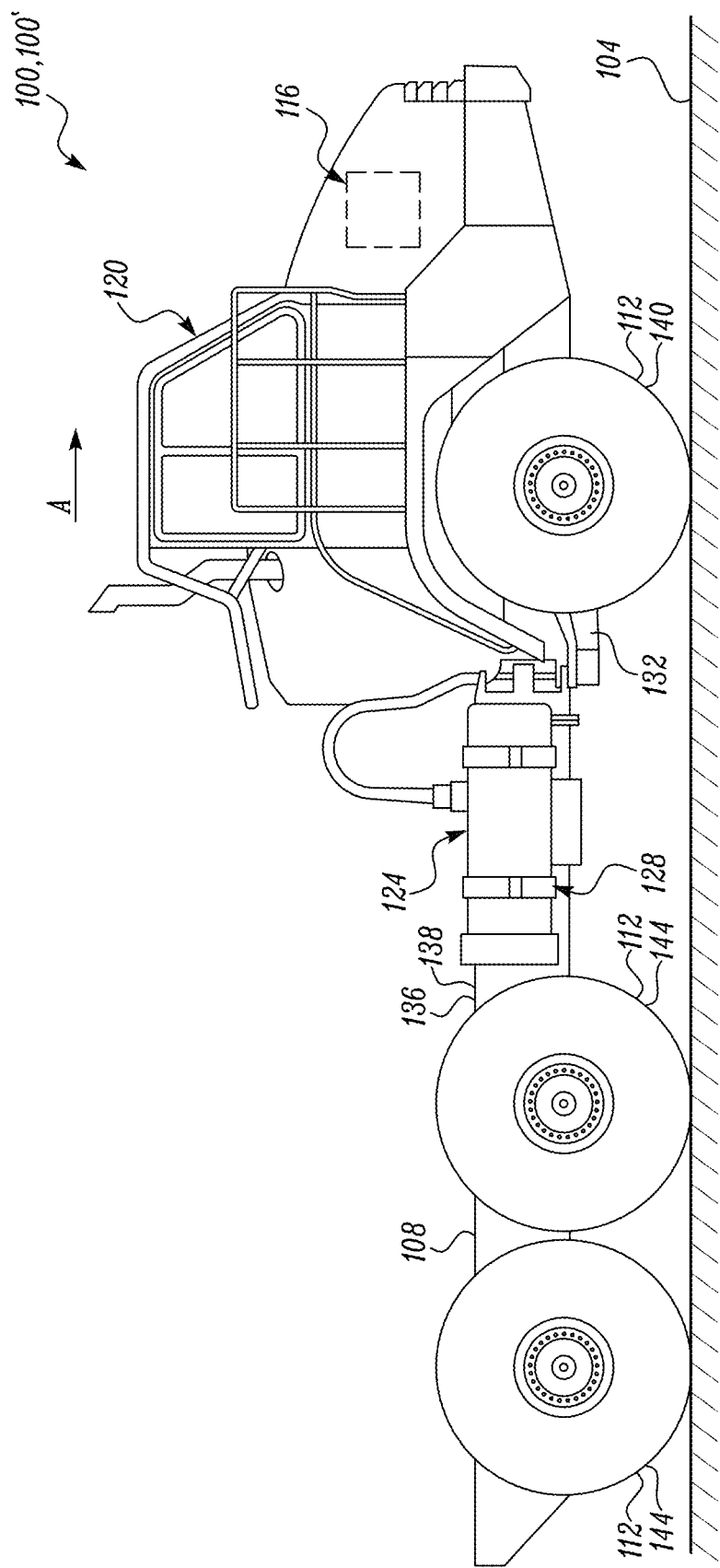
FIG. 1 illustrates an exemplary mobile machine devoid of a dump body thereof and including a tank, in accordance with an embodiment of the present disclosures.

Referring to FIG. 1, an exemplary mobile machine 100 (hereinafter referred to as 'machine 100') is shown. The machine 100 may include an off-highway truck 100' that may traverse back and forth between various locations on a worksite 104. Such exemplary locations may include load locations from where the off-highway truck 100' may receive payload (e.g., ores, boulders, sand, dirt, gravel, etc., not shown), and dump locations up to where the off-highway truck 100' may traverse to so as to release and dump the payload. In an exemplary operation, the off-highway truck 100' may receive the payload from a dump location of the worksite 104, traverse in a forward direction (indicated by an arrow 'A') from a load location toward a dump location of the worksite 104, release and dump the payload at the dump location, and traverse back toward the load location. Examples of the worksite 104 may include a mine site, an underground mine site, a construction site, a landfill, a quarry, etc.

Although references to the off-highway truck 100' are used, aspects of the present disclosure may also be applicable to other mobile machines, such as underground dump trucks, haul trucks, loaders, excavators, etc., and references to the off-highway truck 100' in the present disclosure is to be viewed as purely exemplary. Further, it should be noted that the aspects of the present disclosure may also be applicable to on-highway machines such as buses, trucks, and the like.

The machine 100 includes a frame 108, ground-engaging members 112, and a power source 116. Also, in some embodiments, the machine 100 may include an operator cabin 120. Further, the machine 100 includes a tank 124, and a tank mount 128. The frame 108 may accommodate and/or support the power source 116 and the tank mount 128, although other known components and structures may be supported by the frame 108, as well. In an example, as shown in FIG. 1, the frame 108 includes a ladder-frame structure 108'. The ladder-frame structure 108' may define a front ladder-frame portion 132 and a rear ladder-frame portion 136. The front ladder-frame portion 132 may accommodate and/or support the power source 116, although other known components and structures may be supported by the front ladder-frame portion 132, as well. The rear ladder-frame portion 136 may support the tank mount 128 and the dump body (not shown) of the machine 100. In an example, as shown in FIG. 1, the rear ladder-frame portion 136 may include two longitudinal beams (only one longitudinal beam 138, is shown), and multiple crossbeams (not shown) extending between the two longitudinal beams to couple the two longitudinal beams together.

The ground-engaging members 112 may support the frame 108 on ground at the worksite 104. The ground-engaging members 112 may include a set of front wheels 140 and a set of rear wheels 144. In an example, as shown in FIG. 1, the set of front wheels 140 supports the front ladder-frame portion 132, and the set of rear wheels 144 supports the rear ladder-frame portion 136. In some embodiments, the ground-engaging members 112 may include crawler tracks (not shown) provided either alone or in combination with the wheels 140, 144.

The power source 116 may be any type of combustion engine, for example, a turbine, a spark ignition engine, a compression ignition engine, two-stroke, four stroke, or any other suitable type known in the art, which may combust fuel to produce power required for powering operations of various systems on the machine 100. Examples of the fuel may include, but not limited to, hydrogen, gasoline, diesel fuel, biodiesel, dimethyl ether, alcohol, natural gas, propane, or any combination thereof. In an example, the combustion engine 116 may combust a gaseous hydrogen fuel to power the front wheels 140 and the rear wheels 144 to propel and transport the machine 100 across an expanse of the worksite 104, according to any customary practice known in the art. In other embodiments, the power source 116 may be battery systems, fuel cells, and the like.

Figure 2:
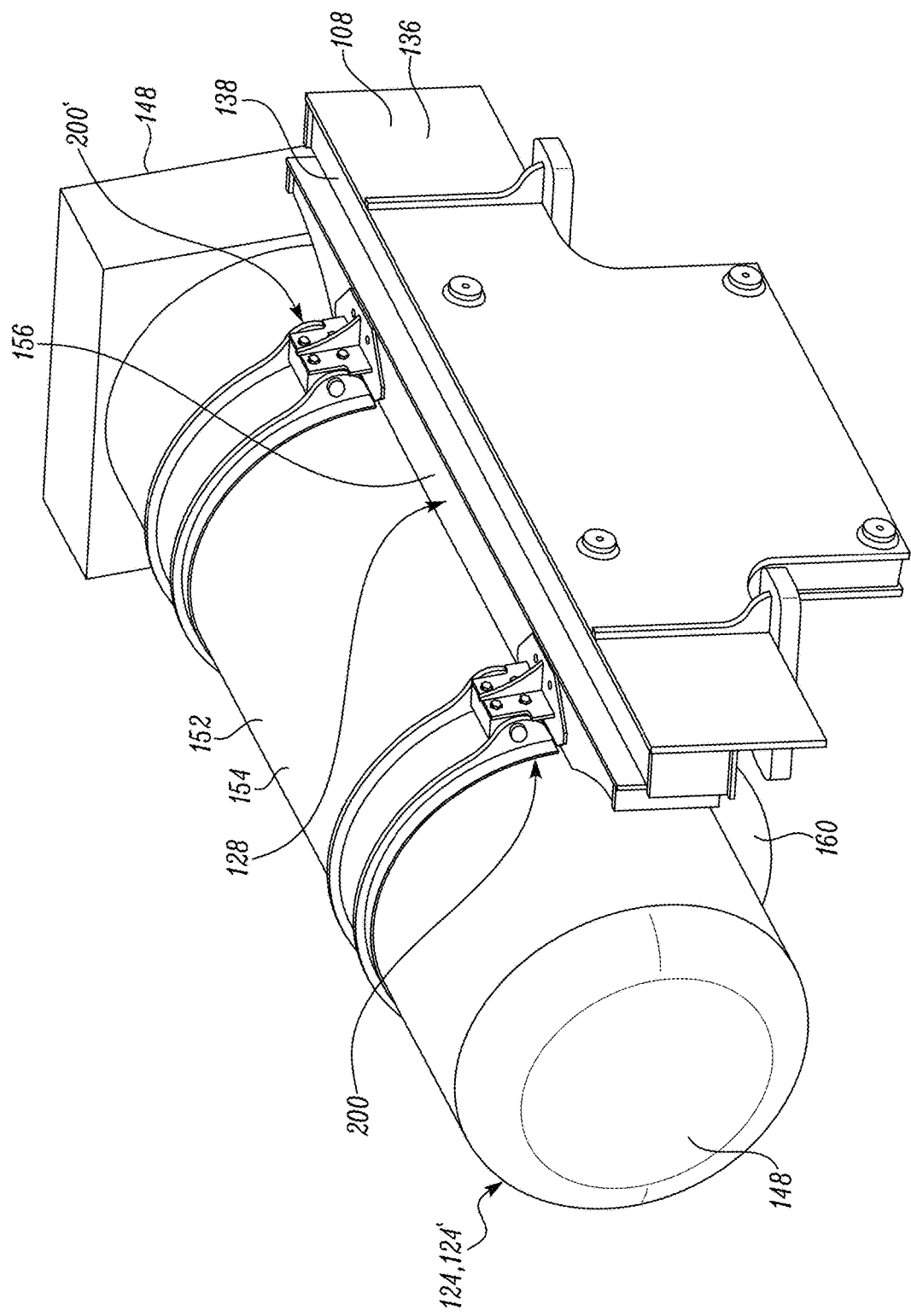
FIG. 2 is a perspective view of the tank secured to a tank mount of the exemplary mobile machine, via an assembly, in accordance with an embodiment of the present disclosure.

The tank 124 is configured to store the fuel (e.g., gaseous hydrogen fuel) for powering the combustion engine 116. Such a fuel may be supplied from the tank 124, for example, via one or more fuel delivery systems (not shown) of the machine 100, to the combustion engine 116. In an example, as shown in FIG. 2, the tank 124 is a cylindrical vessel 124' that have two end walls 148 and one or more sidewalls 152 (e.g., cylindrical, cuboidal, spherical, etc.) extending between the two end walls to form a substantially fluid-tight container that prevents the fuel (e.g., gaseous hydrogen fuel) from leaking, spilling, and/or otherwise escaping the tank. The end walls 148 and the sidewalls 152 together defines a periphery 154 of the tank 124. It should be noted that although the tank 124 described herein is configured for storing fuels such as hydrogen, it may be contemplated that, in other embodiments, the tank 124 may be configured for storing any other type of fluids such as water, coolant, etc.

Figure 3:
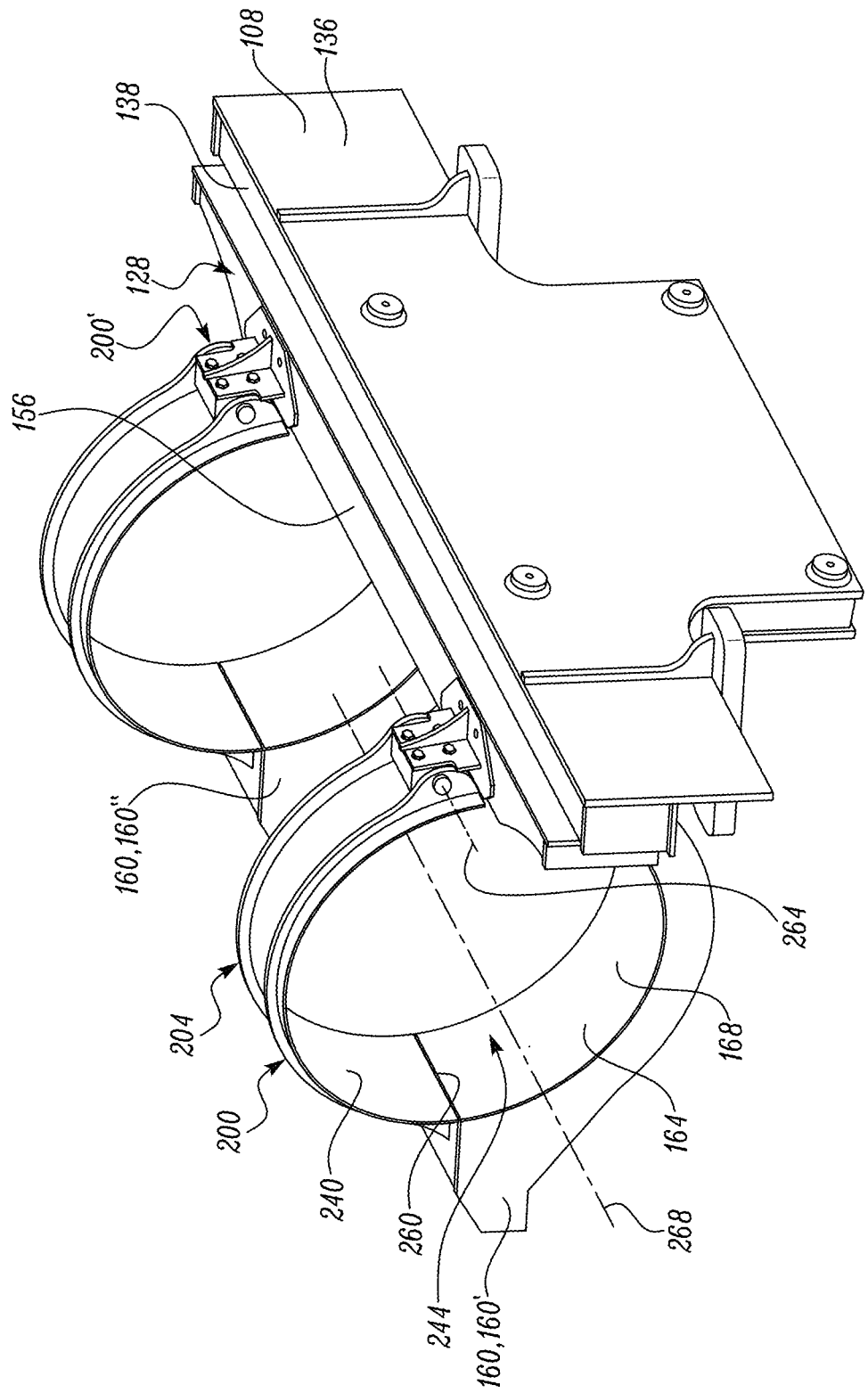
FIG. 3 illustrates the assembly, without the tank, coupled to the tank mount, in accordance with an embodiment of the present disclosure.

The tank mount 128 is configured to support the tank 124 on the frame 108. The tank mount 128 may include a mounting portion 156 and at least one cradle portion 160, as shown in FIGS. 2 and 3. The mounting portion 156 may facilitate coupling of the tank mount 128 to a portion of the frame 108. In an example, the mounting portion 156 may be fixedly coupled to the longitudinal beam 138 of the rear ladder-frame portion 136, for example, via weld connections, or fasteners, etc. Further, as shown in FIG. 3, two cradle portions 160', 160" extend outwardly away from the mounting portion 156. The cradle portion 160' includes a surface 164 that defines a concave portion 168 configured to receive a portion of the cylindrical vessel 124' therewithin. The structure and configuration of the cradle portion 160" are similar to that of the cradle portion 160', and therefore, they are not discussed, for the sake of brevity.

The tank 124 received in the cradle portions 160 of the tank mount 128 is to be secured to the machine 100 in a manner to enable the tank 124 to avoid damage and/or failure of the tank 124 (due to unwarranted movements of the tank 124) as the machine 100 is subjected to significant loads, for example, vertical loads imparted onto the tank due to uneven movement of the machine 100 traversing across the worksite 104. To reliably secure the tank 124 to the tank mount 128 of the machine 100, in one or more aspects of the present disclosure, an assembly 200, 200' is disclosed.

For explanatory purposes, the assembly 200 will be explained in detail with reference to FIGS. 2-4. However, it should be noted that the description provided below for the assembly 200 may be equally applicable to the assembly 200', without any limitations. The assembly 200 includes a band clamp 204, a mounting block 208, and a bracket 212. In addition, the assembly 200 may include a pin 216, one or more first bolts 220, and one or more second bolts 224. Each of the band clamp 204, the mounting block 208, the bracket 212, the pin 216, the one or more first bolts 220, and the one or more second bolts 224 is now discussed.

The band clamp 204 is configured to surround the periphery 154 of the tank 124. Specifically, the band clamp 204 may pass around at least a portion of the sidewall 152 of the tank 124. As shown in FIGS. 3 and 4, the band clamp 204 may include an elongated strap 228 and a pair of apertures 232, 236. The elongated strap 228 may be formed of one or more thin strips of steel, or other metals, or other appropriate materials that may be flexible enough for the elongated strap 228 to conform to the periphery 154 of the tank 124, while also being resistant to stretching under tension due to hoop stresses created when the band clamp 204 is tightened around the periphery 154 of the tank 124.

The elongated strap 228 may define an arcuate portion 240 that defines a concavity facing towards the concave portion 168 of the tank mount 128. The arcuate portion 240 (of the elongated strap 228) and the concave portion 168 (of the cradle portion 160') may combinedly define a cavity 244 (shown in FIG. 3) for accommodating the tank 124. Further, the elongated strap 228 may define two spaced flanges 248, 252. The flanges 248, 252 may extend outwardly from the arcuate portion 240 along a length, defined between opposite ends 256, 260 (shown in FIGS. 3 and 4) of the elongated strap 228.

The apertures 232, 236 may be defined at the flanges 248, 252, respectively. In an example, as shown in FIG. 4, the apertures 232, 236 are defined at their respective flanges 248, 252 at locations proximal to the end 256 of the elongated strap 228 (of the band clamp 204). Each of the apertures 232, 236 may define an axis 264. In an example, as shown in FIG. 3, the axis 264 is parallel to a longitudinal axis 268 of the cavity 244. The apertures 232, 236 may be configured to receive the pin 216 for coupling the mounting block 208 with the band clamp 204, discussed in more detail in the paragraphs below. Further, it should be noted that, in addition to the apertures 232, 236, the band clamp 204 may also include another pair of apertures (not shown) defined at the flanges 248, 252, at locations proximal to the other end 260 of the elongated strap 228.

Figure 4:
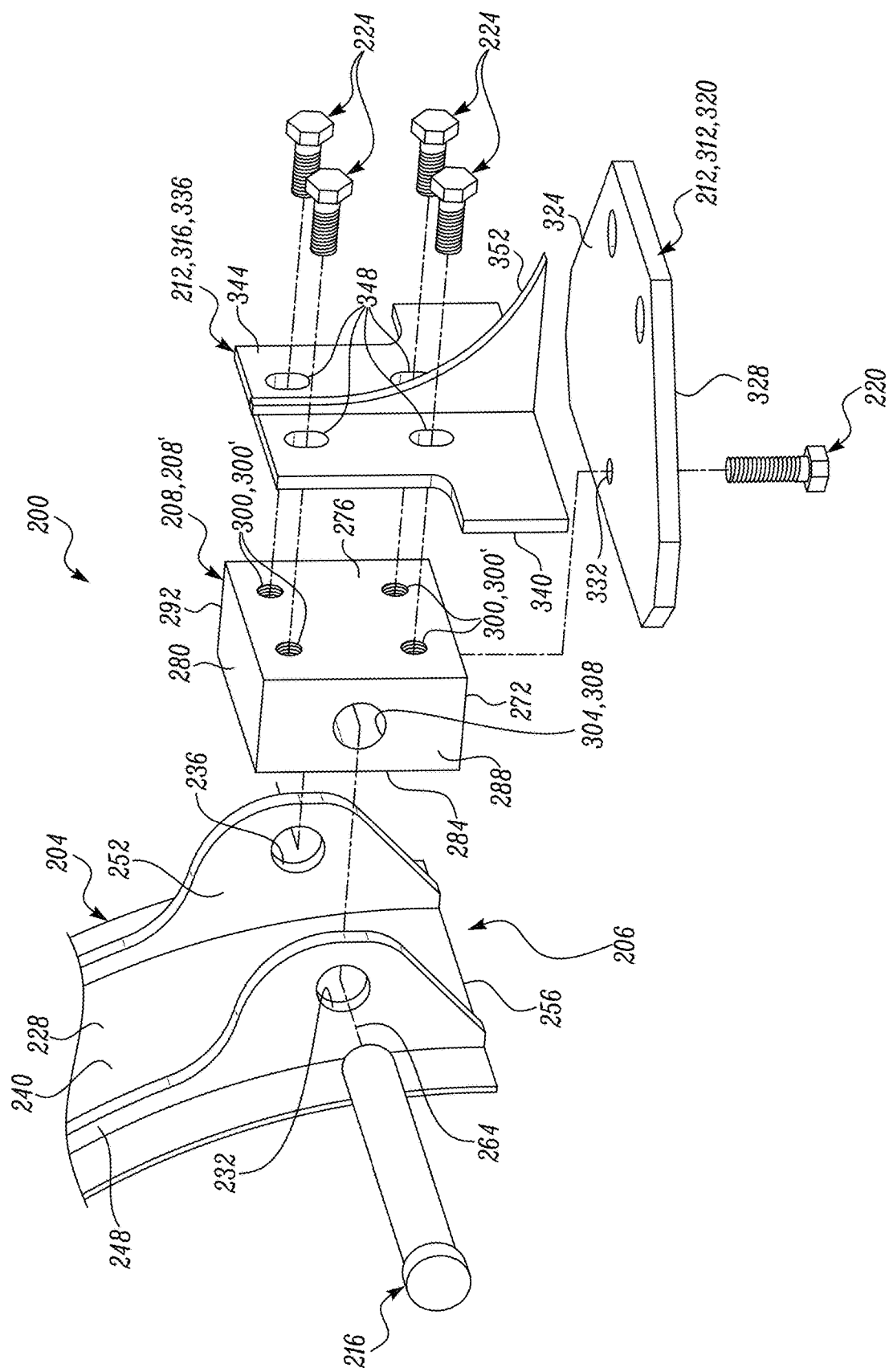
FIG. 4 illustrates an exploded view of the assembly, in accordance with an embodiment of the present disclosure.
Figure 5:
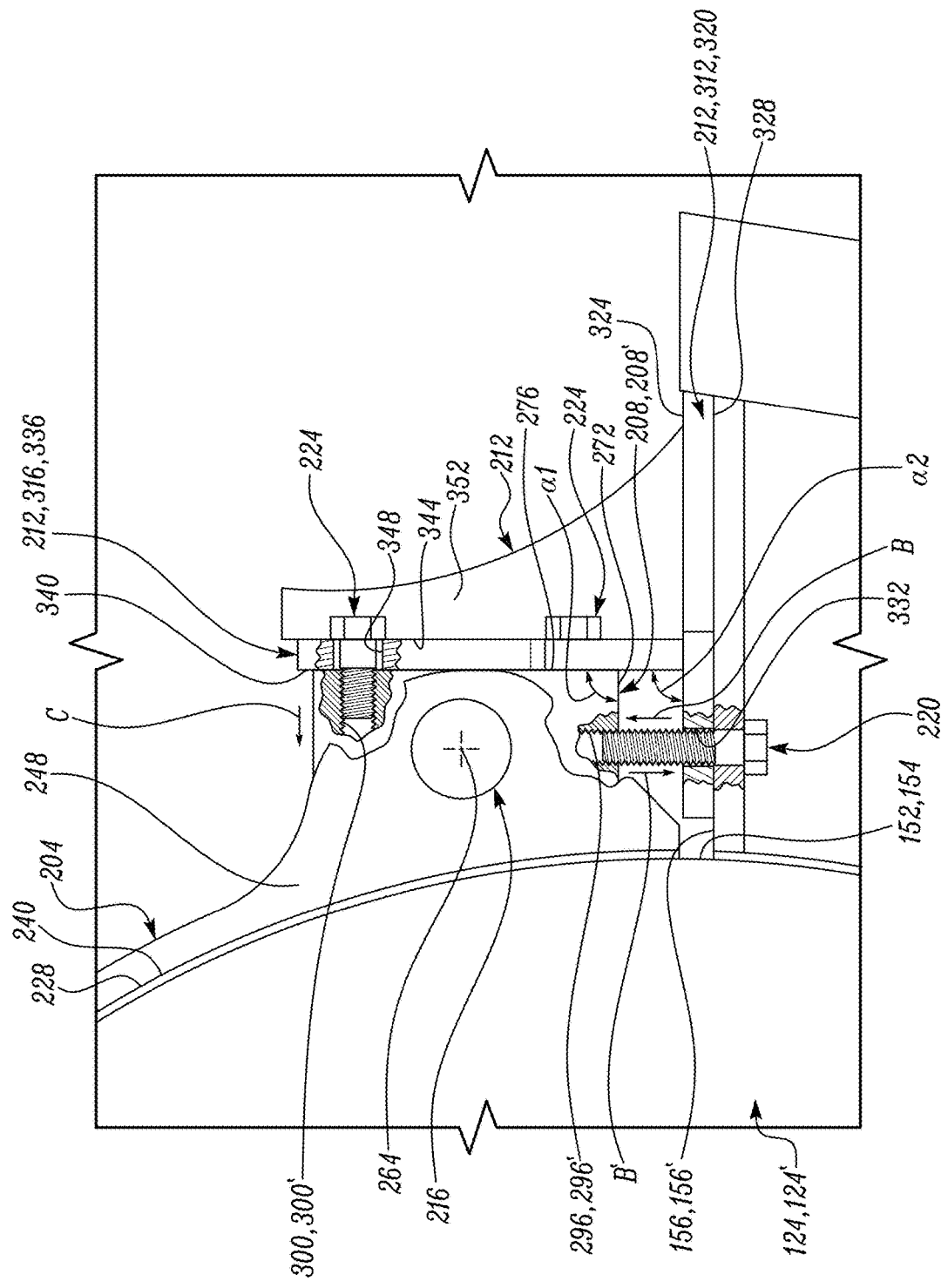
FIG. 5 illustrates a cross-sectional view of the assembly securing the tank to the tank mount, in accordance with an embodiment of the present disclosure.

The mounting block 208 may be embodied as a substantially cuboid shaped structure 208' that defines a plurality of surfaces, namely—a first surface 272, a second surface 276, a third surface 280, a fourth surface 284, a fifth surface 288, and a sixth surface 292, as shown in FIG. 4. The first surface 272 and the third surface 280 may be substantially parallel to one another. The second surface 276 is angled relative to the first surface 272 by a first angle 'α1' (as shown in FIG. 5). The first angle 'α1' may be less than or equal to 95 degrees. In an example, the first angle 'α1' is a right angle (i.e., 90 degrees). The fourth surface 284 may be substantially parallel to the second surface 276. The fifth surface 288 and the sixth surface 292 may be substantially parallel to one another. In addition, the fifth surface 288 and the sixth surface 292 may extend substantially perpendicular to the first surface 272, the second surface 276, the third surface 280, and the fourth surface 284.

Further, the mounting block 208 includes one or more first mounting holes 296 (as shown in FIG. 5) and one or more second mounting holes 300. As shown in FIG. 5, the mounting block 208 includes one first mounting hole 296. The first mounting hole 296 is defined at the first surface 272. The first mounting hole 296 is a threaded hole 296' that extends longitudinally from the first surface 272 in a direction toward the third surface 280. The first mounting hole 296 is configured to threadably engage with the corresponding first bolt 220 to set the tension of the band clamp 204, as discussed in detail below. Further, it should be noted that, in other embodiments, more than one first mounting holes 296 may be defined at the first surface 272 of the mounting block 208.

The mounting block 208 includes four second mounting holes 300, as shown in FIG. 4. The second mounting holes 300 are defined at the second surface 276. Each of the second mounting holes 300 is a threaded hole 300' that extends longitudinally from the second surface 276 in a direction toward the fourth surface 284. The second mounting holes 300 are configured to be threadably engage with their corresponding second bolts 224 to support a load of the tank 124, as discussed in detail below. Further, it should be noted that, in other embodiments, a lower or a higher number of the second mounting holes 300 may be defined at the second surface 276 of the mounting block 208 depending on the required load carrying capacity of the assembly 200.

Further, the mounting block 208 may include one or more pin receiving portions 304. The pin receiving portions 304 may be configured to receive the pin 216 to pivotally couple the mounting block 208 to the band clamp 204. The pin receiving portions 304 may include a pin hole 308 extending between the fifth surface 288 and the sixth surface 292 of the mounting block 208. Although in FIG. 4, the pin receiving portions 304 are shown as the pin hole 308 extending inwardly through the mounting block 208 between the fifth surface 288 and the sixth surface 292, it may be contemplated that in another embodiment, the pin receiving portions 304 may be embodied as bosses that may extend outwardly from their respective fifth surface 288 and the sixth surface 292. In yet another embodiment, the pin receiving portions 304 may be embodied as any structure, or feature, or configuration known in the art for pivotally coupling the mounting block 208 to the band clamp 204.

The bracket 212 is now discussed. The bracket 212 includes a first portion 312 and a second portion 316. By way of non-limiting example, the first portion 312 may be embodied as a flat plate 320 that defines a first surface 324 and a second surface 328 opposite to the first surface 324. In addition, the first portion 312 (or the flat plate 320) includes one or more third mounting holes 332 that may extend from the first surface 324 to the second surface 328. The third mounting holes 332 may correspond to their respective first mounting holes 296 of the mounting block 208. In an example, as shown in FIG. 4, the first portion 312 (or the flat plate 320) includes one third mounting hole 332 that may cooperate with its corresponding first mounting hole 296 to facilitate coupling of the first portion 312 (of the bracket 212) and the mounting block 208, via the first bolt 220. It should be noted that in other embodiments, more than one third mounting hole 332 may be defined at the first portion 312 depending on the number of the first mounting holes 296 of the mounting block 208.

The first portion 312 (of the bracket 212) is configured to be coupled to the tank mount 128. In an example, as shown in FIG. 5, the first portion 312 is fixedly coupled to the mounting portion 156 of the tank mount 128 (e.g., to an upper surface 156' of the tank mount 128), for example, via a welded connection, or via one or more fasteners. The first portion 312 is coupled to the tank mount 128 in a manner such that the second surface 328 is abutted against the mounting portion 156 (of the tank mount 128), and that the first surface 324 is located away from the mounting portion 156.

The second portion 316 may include a planar plate 336 that defines a third surface 340 and a fourth surface 344 opposite to the third surface 340. In addition, the second portion 316 includes one or more fourth mounting holes 348 that may extend from the third surface 340 to the fourth surface 344. The fourth mounting holes 348 may correspond to their respective second mounting holes 300 of the mounting block 208. In an example, as shown in FIG. 4, the second portion 316 includes four fourth mounting holes 348 that may cooperate with their corresponding four second mounting holes 300 to facilitate coupling of the second portion 316

(of the bracket 212) and the mounting block 208, via the second bolts 224. It should be noted that in other embodiments, a higher or a lower number of the fourth mounting holes 348 may be defined at the second portion 316 depending on the number of the second mounting holes 300 of the mounting block 208. Further, the fourth mounting holes 348 may be oblong in shape to allow the second bolts 224 to move relative to the bracket 212 as the first bolt 220 is threaded into or out of the first mounting hole 296 to set the tension of the band clamp 204.

The second portion 316 is coupled to the first portion 312. In an example, as shown in FIG. 5, the second portion 316 is fixedly coupled to the first portion 312, for example, via a welded connection. The second portion 316 is coupled to the first portion 312 in a manner such that the third surface 340 (of the second portion 316) may face and abut against the second surface 276 of the mounting block 208. Further, the second portion 316 coupled to the first portion 312 such that the second portion 316 is angled relative to the first portion 312 by a second angle 'α2' (shown in FIG. 5). The second angle 'α2' may be less than or equal to 95 degrees. The second angle 'α2' may be equal to the first angle 'α1'. In an example, the second angle 'α2' is a right angle (i.e., 90 degrees).

Additionally, the second portion 316 may include a gusset plate 352 affixed to the fourth surface 344 (of the planar plate 336) and the first surface 324 (of the first portion 312), via welded connections, to reinforce the second portion 316.

INDUSTRIAL APPLICABILITY

Figure 6:
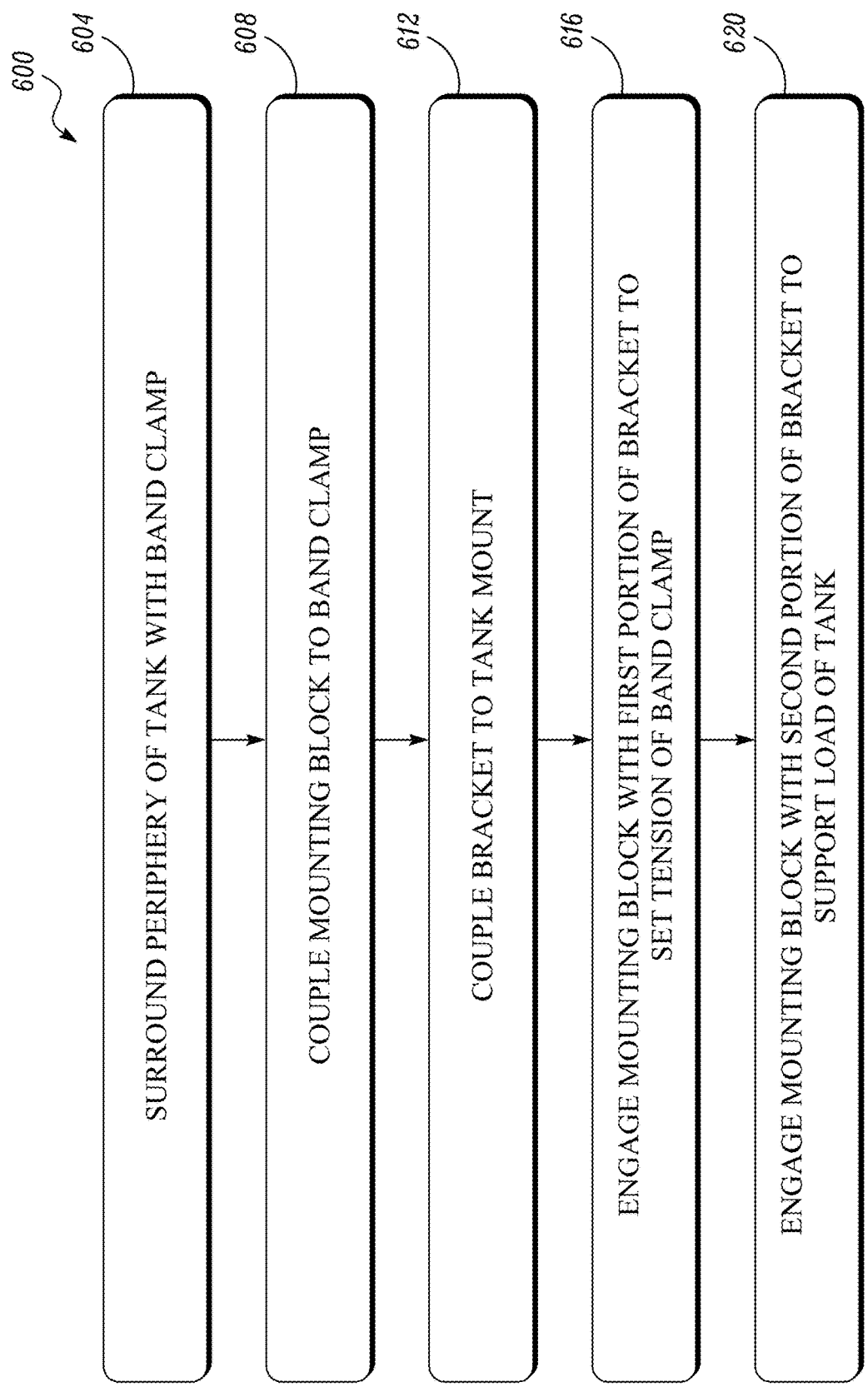
FIG. 6 is a flowchart illustrating a method for securing the tank to the tank mount, in accordance with an embodiment of the present disclosure.

Referring to FIG. 6, an exemplary method for securing the tank 124 to the tank mount 128 of the machine 100, using the assembly 200, is now discussed. The method is discussed by way of a flowchart 600 that illustrates example steps (i.e., from 604 to 620) associated with the method. The exemplary method is also discussed in conjunction with FIGS. 1-5.

Initially, the tank 124 to be mounted to the machine 100 may be received in the cradle portions 160, 160' (of the tank mount 128) in a manner such that the periphery 154 of the tank 124 is seated in the concave portions 168 of the cradle portions 160, 160'. Subsequently, the periphery 154 of the tank 124 is surrounded by the band clamp 204, at step 604. In an example, the arcuate portion 240 of the elongated strap 228 (of the band clamp 204) is wrapped around a portion of the periphery 154 of the tank 124 such that the end 256 of the elongated strap 228 is located proximal to the mounting portion 156 of the tank mount 128 and the end 260 (opposite to the end 256) of the elongated strap 228 is located distal from the mounting portion 156.

Further, at step 608, the mounting block 208 is coupled to the band clamp 204. In an exemplary coupling of the mounting block 208 and the band clamp 204, the pin receiving portions 304 (e.g., the pin hole 308) of the mounting block 208 are aligned with their corresponding apertures 232, 236 of the band clamp 204. Further, in the coupling of the mounting block 208 and the band clamp 204, the pin 216 may be received within the aperture 232, the pin hole 308, and the aperture 236, and may be secured to couple the mounting block 208 to the band clamp 204. In that manner, the mounting block 208 is pivotally coupled with the band clamp 204 about the axis 264 via the pin 216 and the pair of apertures 232, 236. The mounting block 208 is coupled with the band clamp 204 in a manner such that the fourth surface 284 of the mounting block 208 faces toward the elongated strap 228 of the band clamp 204. The mounting block 208 and the bracket 212 are positioned on a lateral side 206 of the band clamp 204. For example, the mounting block 208 is coupled with the band clamp 204 in a manner such that the first surface 272 of the mounting block 208 may be perpendicular to the band clamp 204, and that the second surface 276 of the mounting block 208 may be tangential to the band clamp 204. It should be noted that in some embodiments, initially, the mounting block 208 may be coupled with the band clamp 204, and then the band clamp 204 (along with the mounting block 208) may be wrapped around the periphery 154 of the tank 124.

Further, at step 612, the bracket 212 is coupled to the tank mount 128. In an exemplary coupling of the bracket 212 with the tank mount 128, the second surface 328 of the first portion 312 (i.e., of the flat plate 320) is disposed on the mounting portion 156 of the tank mount 128, and is fixedly coupled to the mounting portion 156, for example, via the welded connections.

Once the bracket 212 is coupled to the tank mount 128, the mounting block 208 is engaged with the first portion 312 of the bracket 212 to set the tension of the band clamp 204, at step 616. In an exemplary engagement of the mounting block 208 with the first portion 312 of the bracket 212, the first bolt 220 is passed through the third mounting hole 332 (of the first portion 312) and inserted within the first mounting hole 296 (of the mounting block 208) to threadably engage with the first mounting hole 296, as shown in FIG. 5. Once the first bolt 220 is threadably engaged with the first mounting hole 296, the first bolt 220 is adjusted, i.e., threaded into or out of the first mounting hole 296 along directions B-B' to set the tension of the band clamp 204, for example, to constrain the tank 124 from movement (in excess of expansion of the sidewall 152) within the cavity 244.

Further, the mounting block 208 is engaged with the second portion 316 of the bracket 212 to support the load of the tank 124, at step 620. In an exemplary engagement of the mounting block 208 with the second portion 316 of the bracket 212, the second bolts 224 are passed through their corresponding fourth mounting holes 348 and are further inserted (in a direction C) within their corresponding second mounting holes 300 to threadably engage with their corresponding second mounting holes 300, as shown in FIG. 5, to fixedly couple the mounting block 208 with the second portion 316 of the bracket 212.

The assembly 200, 200' facilitates the operators/supervisors to adjust and set the tension of the band clamp 204 (via the one or more first bolts 220) independently from supporting the load of the tank 124, via the one or more second bolts 224. That is, the assembly 200, 200' allows the operator to adjust the tension of the band clamp 204 to increase or decrease stress induced on the tank 124 by the band clamp 204 without increasing or decreasing load carrying capability of the assembly 200, 200' for retaining the tank 124, and vice versa. In this manner, the assembly 200, 200' minimizes or eliminates interdependency between clamp tensioning and load-carrying capacity observed in known single bolt clamping mechanisms used for securing tanks to the mobile machines, and hence provides flexible and reliable solutions for securing tanks onto the mobile machines.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Further, it should be noted that the antecedent "substantially" used in the present disclosure means largely, but not wholly, the same form, manner or degree, and the particular element will have a range of configurations as a person of ordinary skill in the art would consider as having the same function or result. As an example, "substantially parallel" need not be exactly 180 degrees but may also encompass slight variations of a few degrees based on the context. As an example, when two angles are "substantially the same," the two angles may differ by up to 5 degrees.

It will be apparent to those skilled in the art that various modifications and variations can be made to the assembly, the method, and/or the mobile machine of the present disclosure without departing from the scope of the disclosure. Other embodiments will be apparent to those skilled in the art from consideration of the specification and practice of the assembly, the method, and/or the mobile machine disclosed herein. It is intended that the specification and examples be considered as exemplary only, with a true scope of the disclosure being indicated by the following claims and their equivalent.

What is claimed is:

1. An assembly for securing a tank to a tank mount of a mobile machine, the assembly comprising:
    a band clamp configured to surround a periphery of the tank;
    a mounting block coupled to the band clamp and including one or more first mounting holes defined in a first surface and one or more second mounting holes defined in a second surface that is angled relative to the first surface by a first angle; and
    a bracket including:
        a first portion coupled to the tank mount; and
        a second portion coupled to the first portion and angled relative to the first portion by a second angle,
    wherein the mounting block is configured to be engaged with the first portion of the bracket, via the one or more first mounting holes, to set a tension of the band clamp, and
    wherein the mounting block is configured to be engaged with the second portion of the bracket, via the one or more second mounting holes, to support a load of the tank.

2. The assembly of claim 1, wherein the first portion of the bracket includes one or more third mounting holes that correspond to the respective one or more first mounting holes of the mounting block, and
    wherein the second portion of the bracket includes one or more fourth mounting holes that correspond to the respective one or more second mounting holes of the mounting block.

3. The assembly of claim 2, wherein the first and second mounting holes are threaded, the assembly further comprising:
    one or more first bolts coupling the mounting block with the first portion of the bracket via the respective first and third mounting holes; and
    one or more second bolts coupling the mounting block with the second portion of the bracket via the respective second and fourth mounting holes.

4. The assembly of claim 3, wherein the one or more fourth mounting holes are oblong to allow the one or more second bolts to move relative to the bracket as the one or more first bolts are threaded into or out of the respective one or more first mounting holes to set the tension of the band clamp, wherein the support of the load of the tank via the one or more second bolts is independent of the tension of the band clamp that is set via the one or more first bolts.

5. The assembly of claim 1, wherein the bracket is attached to an upper surface of the tank mount.

6. The assembly of claim 1, wherein the first and second angles are substantially the same.

7. The assembly of claim 1, wherein the mounting block and the bracket are positioned on a lateral side of the band clamp.

8. The assembly of claim 1, wherein the band clamp includes a pair of apertures defining an axis, wherein the assembly further comprises a pin, and wherein the mounting block is coupled with the band clamp about the axis via the pin and the pair of apertures.

9. A method for securing a tank to a tank mount of a mobile machine, the method comprising:
    surrounding a periphery of the tank with a band clamp;
    coupling a mounting block to the band clamp, the mounting block including one or more first mounting holes defined in a first surface and one or more second mounting holes defined in a second surface that is angled relative to the first surface by a first angle;
    coupling a bracket to the tank mount, the bracket including:
        a first portion coupled to the tank mount; and
        a second portion coupled to the first portion and angled relative to the first portion by a second angle;
    engaging, via the one or more first mounting holes, the mounting block with the first portion of the bracket to set a tension of the band clamp; and
    engaging, via the one or more second mounting holes, the mounting block with the second portion of the bracket to support a load of the tank.

10. The method of claim 9, wherein the first portion of the bracket includes one or more third mounting holes that correspond to the respective one or more first mounting holes of the mounting block, the second portion of the bracket includes one or more fourth mounting holes that correspond to the respective one or more second mounting holes of the mounting block, wherein the first and second mounting holes are threaded, and wherein engaging the mounting block with the first portion and the second portion of the bracket includes:
    coupling, via one or more first bolts, the mounting block with the first portion of the bracket via the respective first and third mounting holes; and
    coupling, via one or more second bolts, the mounting block with the second portion of the bracket via the respective second and fourth mounting holes.

11. The method of claim 10, wherein the one or more fourth mounting holes are oblong to allow the one or more second bolts to move relative to the bracket as the one or more first bolts are threaded into or out of the respective one or more first mounting holes to set the tension of the band clamp, the method further including adjusting the tension of the band clamp that is set via the one or more first bolts independently from the support of the load of the tank via the one or more second bolts.

12. The method of claim 9, wherein the bracket is attached to an upper surface of the tank mount.

13. The method of claim 9, wherein the mounting block and the bracket are positioned on a lateral side of the band clamp.

14. The method of claim 9, wherein the band clamp includes a pair of apertures defining an axis, and wherein the mounting block is coupled with the band clamp about the axis via a pin and the pair of apertures.

15. A mobile machine, comprising:
 a frame;
 a power source supported on the frame;
 a tank to store fuel for powering the power source;
 a tank mount for supporting the tank on the frame; and
 an assembly for securing the tank to the tank mount, the assembly including:
  a band clamp configured to surround a periphery of the tank;
  a mounting block coupled to the band clamp and including one or more first mounting holes defined in a first surface and one or more second mounting holes defined in a second surface that is angled relative to the first surface by a first angle; and
 a bracket including:
  a first portion coupled to the tank mount; and
  a second portion coupled to the first portion and angled relative to the first portion by a second angle,
 wherein the mounting block is configured to be engaged with the first portion of the bracket, via the one or more first mounting holes, to set a tension of the band clamp, and
 wherein the mounting block is configured to be engaged with the second portion of the bracket, via the one or more second mounting holes, to support a load of the tank.

16. The mobile machine of claim 15, wherein the first portion of the bracket includes one or more third mounting holes that correspond to the respective one or more first mounting holes of the mounting block and the second portion of the bracket includes one or more fourth mounting holes that correspond to the respective one or more second mounting holes of the mounting block, and wherein the first and second mounting holes are threaded, the assembly further comprising:

one or more first bolts coupling the mounting block with the first portion of the bracket via the respective first and third mounting holes; and one or more second bolts coupling the mounting block with the second portion of the bracket via the respective second and fourth mounting holes.

17. The mobile machine of claim 16, wherein the one or more fourth mounting holes are oblong to allow the one or more second bolts to move relative to the bracket as the one or more first bolts are threaded into or out of the respective one or more first mounting holes to set the tension of the band clamp, wherein the support of the load of the tank via the one or more second bolts is independent of the tension of the band clamp that is set via the one or more first bolts.

18. The mobile machine of claim 15, wherein the bracket is attached to an upper surface of the tank mount.

19. The mobile machine of claim 15, wherein the mounting block and the bracket are positioned on a lateral side of the band clamp.

20. The mobile machine of claim 15, wherein the band clamp includes a pair of apertures defining an axis, wherein the assembly further comprises a pin, and wherein the mounting block is coupled with the band clamp about the axis via the pin and the pair of apertures.

* * * * *